United States Patent
Park et al.

(10) Patent No.: US 9,382,407 B2
(45) Date of Patent: Jul. 5, 2016

(54) MASTERBATCH COMPOSITION, METHOD OF USING, AND RUBBER COMPOSITION

(71) Applicant: 3M INNOVATIVE PROPERTIES COMPANY, St. Paul, MN (US)

(72) Inventors: Dae-Soon Park, Seongnam-si (KR); Sung Wook Lim, Busan (KR); Stephen E. Amos, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/409,926

(22) PCT Filed: Jun. 25, 2013

(86) PCT No.: PCT/US2013/047534
§ 371 (c)(1),
(2) Date: Dec. 19, 2014

(87) PCT Pub. No.: WO2014/004455
PCT Pub. Date: Jan. 3, 2014

(65) Prior Publication Data
US 2015/0368446 A1    Dec. 24, 2015

Related U.S. Application Data

(60) Provisional application No. 61/663,844, filed on Jun. 25, 2012.

(51) Int. Cl.
| | |
|---|---|
| *C08K 3/22* | (2006.01) |
| *C08L 9/00* | (2006.01) |
| *A43B 13/04* | (2006.01) |
| *C08K 3/36* | (2006.01) |
| *C08J 3/22* | (2006.01) |
| *B29D 35/00* | (2010.01) |
| *B29D 35/12* | (2010.01) |
| *B29K 9/00* | (2006.01) |

(52) U.S. Cl.
CPC . *C08L 9/00* (2013.01); *A43B 13/04* (2013.01); *B29D 35/0054* (2013.01); *B29D 35/122* (2013.01); *C08J 3/226* (2013.01); *C08K 3/36* (2013.01); *B29K 2009/00* (2013.01); *B29K 2093/00* (2013.01); *B29K 2995/0077* (2013.01); *C08J 2323/22* (2013.01); *C08J 2423/22* (2013.01)

(58) Field of Classification Search
CPC .................. C08J 3/22; C08J 9/32; C08K 7/22
USPC ................................................. 523/219, 351
See application file for complete search history.

(56) References Cited

U.S. PATENT DOCUMENTS

| | | |
|---|---|---|
| 2,978,340 A | 4/1961 | Veatch |
| 3,030,215 A | 4/1962 | Veatch |
| 3,129,086 A | 4/1964 | Veatch |
| 3,230,064 A | 1/1966 | Veatch |
| 3,365,315 A | 1/1968 | Beck |
| 4,391,646 A | 7/1983 | Howell |
| 4,767,726 A | 8/1988 | Marshall |
| 5,032,627 A | 7/1991 | Wilson |
| 5,552,457 A | 9/1996 | Bull, Jr. |
| 6,096,804 A | 8/2000 | Whiteley |
| 6,333,364 B2 | 12/2001 | Meguriya |
| 2002/0137852 A1 | 9/2002 | Sasaki et al. |
| 2004/0220321 A1 | 11/2004 | Bataille |
| 2006/0122049 A1 | 6/2006 | Marshall |
| 2007/0104943 A1 | 5/2007 | D'Souza |
| 2012/0108691 A1 | 5/2012 | Meyer |

FOREIGN PATENT DOCUMENTS

| | | |
|---|---|---|
| CN | 102040751 | 5/2011 |
| EP | 1369454 | 12/2003 |
| JP | 07-188467 | 7/1995 |
| JP | 08-324212 | 12/1996 |
| JP | 2006241335 | 9/2006 |
| KR | 10-0868885 | 11/2008 |
| KR | 10-0894516 | 4/2009 |
| KR | 2012-0021903 | 3/2012 |
| KR | 10-1217692 | 1/2013 |
| SU | 1742285 | 6/1992 |
| WO | WO 2012033810 | 3/2012 |

OTHER PUBLICATIONS

The State Intellectual Property Office of the People's Republic of China Search Report for CN Application No. 201300338l6.8, dated Sep. 17, 2015, 1 page.
Supplementary European Search Report for Application No. EP13810572, dated Nov. 13, 2015, 2 pages.
JSR RB, "Outstanding features and typical applications of JSR RB", 10 pages.
IMM Staff, "How glass bubbles can reduce the weight of TPO parts,"3 pages, published Sep. 3, 2010, at http://www.plasticstoday.com/imm/articles/3m.
"3M™ Microspheres Selection Guide", 3M Center. Energy and Advanced Materials Division, (Mar. 2013), 4 pages.
International Search report for PCT International Application No. PCT/US2013/047534, mailed on Sep. 25, 2013, 4 pages.

*Primary Examiner* — Edward Cain

(57) ABSTRACT

A masterbatch composition including glass bubbles dispersed in a blend of syndiotactic 1,2-polybutadiene and cis-1,4-polybutadiene is disclosed. The glass bubbles are present in an amount of at least 30 percent by weight, based on the total weight of the masterbatch composition. A method of making a rubber composition from the masterbatch composition is disclosed as well as a rubber composition and vulcanized rubber made from the masterbatch composition.

17 Claims, No Drawings

MASTERBATCH COMPOSITION, METHOD OF USING, AND RUBBER COMPOSITION

BACKGROUND

Glass bubbles having an average diameter of less than about 500 micrometers, also commonly known as "glass microbubbles", "hollow glass microspheres", "hollow glass beads", or "glass balloons" are widely used in industry, for example, as additives to polymeric compositions. In many industries, glass bubbles are useful, for example, for lowering weight and improving processing, dimensional stability, and flow properties of a polymeric composition. Generally, it is desirable that the glass bubbles be strong enough to avoid being crushed or broken during processing of the particular polymeric compound. Glass bubbles have been incorporated into rubber compositions. For example, glass bubbles have been incorporated into rubber compositions for shoe outsoles to lower the weight of the rubber composition. See, e.g., Korean Patent Nos. 100894516, published Apr. 22, 2009, and 100868885, published Nov. 17, 2009.

SUMMARY

While including glass bubbles in polymeric compositions can provide many benefits, the process of adding glass bubbles into a polymer in a manufacturing process can pose some challenges. Handling glass bubbles may be similar to handling light powders. The glass bubbles may not be easily contained and difficult to use in a clean environment. It can also be difficult to add an accurate amount of glass bubbles to the polymer. The present disclosure provides a masterbatch composition useful, for example, for incorporating glass bubbles into a final, end-use rubber composition. Delivering the glass bubbles in a masterbatch composition can eliminate at least some of the handling difficulties encountered during manufacturing.

Making a masterbatch composition also provides challenges, however. It is desirable for a masterbatch composition to have a relatively high loading of glass bubbles with minimal breakage to achieve the greatest benefits in the final, end-use composition. It is also desirable for the masterbatch composition to be readily incorporated into a variety of host resins to provide flexibility in formulating the final, end-use composition.

The masterbatch composition according to the present disclosure includes syndiotactic 1,2-polybutadiene and cis-1,4-polybutadiene and a relatively high level of glass bubbles. The masterbatch composition is compatible with a variety of rubber resins that include natural rubber and/or polybutadienes for letting down the masterbatch composition to provide compositions with final properties useful, for example, for outer soles of shoes. Advantageously, the masterbatch composition disclosed herein can provide a lower density than similar masterbatch compositions that contain blends of polybutadiene and natural rubber because of lower glass bubble breakage in the masterbatch composition disclosed herein. Also, rubber compositions made from the masterbatch composition disclosed herein have similar or, in some cases, better properties (e.g., better tensile strength and elongation) than those made from the same materials but made by compounding the glass bubbles directly into the final, end-use rubber composition.

In one aspect, the present disclosure provides a masterbatch composition that includes glass bubbles dispersed in a blend of syndiotactic 1,2-polybutadiene and cis-1,4-polybutadiene. The glass bubbles are present in an amount of at least 30 percent by weight, based on the total weight of the masterbatch composition.

In another aspect, the present disclosure provides a method that includes combining a masterbatch disclosed herein with at least one of a polyisoprene or a polybutadiene to provide a rubber composition.

In another aspect, the present disclosure provides a rubber composition that includes syndiotactic 1,2-polybutadiene, cis 1,4-polybutadiene, glass bubbles, and optionally polyisoprene. The glass bubbles are present in a range from 5 to 20 percent by weight, based on the total weight of the rubber composition. The ratio of syndiotactic 1,2-polybutadiene to cis-1,4-polybutadiene is in a range from 50:50 to 10:90, and the rubber composition is substantially free of silica filler. In another aspect, the present disclosure provides a vulcanized rubber prepared from this rubber composition. In another aspect, the present disclosure provides a shoe sole made from this rubber composition.

For the rubber composition disclosed herein, the presence of glass bubbles can provide a productivity improvement by enhancing flow properties and reducing specific heat so that cooling times or curing times may be reduced. Furthermore, the final, vulcanized rubber compositions including glass bubbles are typically lighter weight, less flammable, more dimensionally stable, and have better thermal insulation properties (which may be useful, e.g., in boots for firefighters) than products that do not contain glass bubbles and typically have excellent mechanical properties even in the absence of reinforcing fillers.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

The masterbatch composition according to the present disclosure includes a blend of syndiotactic 1,2-polybutadiene and cis-1,4-polybutadiene. In some embodiments, the blend consists of syndiotactic 1,2-polybutadiene and cis-1,4-polybutadiene (that is, the masterbatch composition does not include other polymers (e.g., rubber resins) other than syndiotactic 1,2-polybutadiene and cis-1,4-polybutadiene). A blend of syndiotactic 1,2-polybutadiene and cis-1,4-polybutadiene can readily be combined with glass bubbles, processed into a variety of masterbatch forms (e.g., sheet, pellet, or granular), and combined with other polymers (e.g., rubber resins) to make a final end-use composition. In some embodiments, the weight ratio of syndiotactic 1,2-polybutadiene to cis-1,4-polybutadiene in the blend is in a range from 30:70 to 80:20 or from 30:70 to 70:30. Examples of useful weight ratios of syndiotactic 1,2-polybutadiene to cis-1,4-polybutadiene include 40:60 and 70:30. If the masterbatch composition contains only cis-1,4-polybutadiene (without any syndiotactic 1,2-polybutadiene), the masterbatch composition may be too sticky to be provided in certain forms. For example, the masterbatch composition may be difficult to load into a granulator to prepare a masterbatch in pellet or granular form. Also, as shown for Comparative Master Batch A in the Examples, below, a masterbatch composition having only cis-1,4-polybutadiene (without any syndiotactic 1,2-polybutadiene) had a higher amount of glass bubble breakage during mixing than a masterbatch according to the present disclosure, as evidenced by the measured density of the masterbatch being 25% higher than the theoretical density.

Stereospecific polybutadienes including syndiotactic 1,2-polybutadiene and cis-1,4-polybutadiene can be obtained from a variety of commercial sources. For example, cis-1,4-polybutadiene is available from LG Chem, Ltd. (Seoul, South Korea) and Korea Kumho Petrochemical Co., (Seoul, South Korea) under the trade designations "BR-1208" and "KOSYN KBR-01L", respectively. Syndiotactic 1,2-polybutadiene is available, for example, from JSR Corporation (Tokyo, Japan) under the trade designation "JSR RB-830". Blends of syndiotactic 1,2-polybutadiene and cis-1,4-polybutadiene are also available, for example, from UBE America (New York City, N.Y.) under the trade designation "UBEPOL VCR-617".

In some embodiments, the blend including syndiotactic 1,2-polybutadiene and cis-1,4-polybutadiene further includes another polybutadiene isomer, for example, up to 5 percent by weight, based on the total weight of the polymer blend in the masterbatch composition. Small amounts of polyisoprene (e.g., up to 5 percent by weight, based on the total weight of the polymer blend in the masterbatch composition) may also be present. However, in some embodiments, the masterbatch is substantially free of natural rubber. "Substantially free" of natural rubber means that the masterbatch contains up to 1 percent by weight natural rubber, based on the total weight of the polymer blend in the masterbatch composition. "Substantially free" of natural rubber can also mean free of natural rubber. Natural rubber is a tougher resin than some synthetic rubber resins, and high shear forces can result when natural rubber is used in the masterbatch composition. As a result, as shown for Comparative Master Batch B in the Examples, below, a masterbatch composition having 5 percent by weight natural rubber had a higher amount of glass bubble breakage during mixing, as evidenced by the measured density of the masterbatch being significantly higher than the theoretical density. In masterbatch compositions that include only cis 1,4-polybutadiene and 1,2-syndiotactic polybutadiene, the measured density of the masterbatch composition was much closer to theoretical as shown in Table 4 in the Examples, below.

Glass bubbles useful for practicing the present disclosure can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U. S. Pat. App. Pub. No. 2006/0122049 (Marshall et. al). Techniques for preparing glass bubbles typically include heating milled frit, commonly referred to as "feed", which contains a blowing agent (e.g., sulfur or a compound of oxygen and sulfur).

Frit can be made by heating mineral components of glass at high temperatures until molten glass is formed. Any oven that is capable of achieving a temperature hot enough to melt glass may be useful. For example, solar ovens, such as those useful for cooking food, are capable of achieving a temperature of 900° F. (480° C.). The solar oven can incorporate various solar films, solar concentrators, and insulators to maintain the high temperature required to melt the glass and form the frit.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the glass bubbles useful for practicing the present disclosure have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the glass bubbles have a glass composition comprising $B_2O_3$ in a range from 2 percent to 6 percent based on the total weight of the glass bubbles. In some embodiments, the glass bubbles have a glass composition comprising up to 5 percent by weight $Al_2O_3$, based on the total weight of the glass bubbles. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Glass bubbles useful for practicing the present disclosure may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% O, based on the total of the glass composition.

The "average true density" of glass bubbles is the quotient obtained by dividing the mass of a sample of glass bubbles by the true volume of that mass of glass bubbles as measured by a gas pycnometer. The "true volume" is the aggregate total volume of the glass bubbles, not the bulk volume. The average true density of the glass bubbles useful for practicing the present disclosure is generally at least 0.30 grams per cubic centimeter (g/cc), 0.35 g/cc, or 0.38 g/cc. In some embodiments, the glass bubbles useful for practicing the present disclosure have an average true density of up to about 0.6 g/cc. "About 0.6 g/cc" means 0.6 g/cc ± five percent. In some of these embodiments, the average true density of the glass bubbles is up to 0.55 g/cc or 0.50 g/cc. For example, the average true density of the glass bubbles disclosed herein may be in a range from 0.30 g/cc to 0.6 g/cc, 0.30 g/cc to 0.55 g/cc, 0.35 g/cc to 0.60 g/cc, or 0.35 g/cc to 0.55 g/cc. For the purposes of this disclosure, average true density is measured using a pycnometer according to ASTM D2840-69, "Average True Particle Density of Hollow Microspheres". The pycnometer may be obtained, for example, under the trade designation "ACCUPYC 1330 PYCNOMETER" from Micromeritics, Norcross, Ga., or under the trade designations "PENTAPYCNOMETER" or "ULTRAPYCNOMETER 1000" from Formanex, Inc., San Diego, Calif. Average true density can typically be measured with an accuracy of 0.001 g/cc. Each of the density values provided above can be ± five percent.

Glass bubbles useful for practicing the present disclosure can be selected to have a size that is smaller than the gap of a two-roll mill useful for blending the masterbatch disclosed herein with other materials. The size of the glass bubbles may be selected so that the median size is smaller than one-half of the gap of the two-roll mill. The median size is also called the D50 size, where 50 percent by volume of the glass bubbles in the distribution are smaller than the indicated size. As used herein, the term size is considered to be equivalent with the diameter and height of the glass bubbles. For the purposes of the present disclosure, the median size by volume is determined by laser light diffraction by dispersing the glass bubbles in deaerated, deionized water. Laser light diffraction particle size analyzers are available, for example, under the trade designation "SATURN DIGISIZER" from Micromeritics. The size distribution of the glass bubbles useful for practicing the present disclosure may be Gaussian, normal, or non-normal. Non-normal distributions may be unimodal or multi-modal (e.g., bimodal).

The glass bubbles useful in the masterbatch compositions disclosed herein typically need to be strong enough to survive a milling process (e.g., Banbury or two-roll milling) or other conventional mixing process for rubbers (e.g., internal mixing). A useful hydrostatic pressure at which ten percent by volume of the glass bubbles collapses is at least about 20 (in some embodiments, at least about 38, 50, or 55) Megapascals (MPa). "About 20 MPa" means 20 MPa ± five percent. In some embodiments, a hydrostatic pressure at which ten percent by volume of the glass bubbles collapses can be at least 100, 110, or 120 MPa. In some embodiments, a hydrostatic pressure at which ten percent, or twenty percent, by volume of the glass bubbles collapses is up to 250 (in some embodiments, up to 210, 190, or 170) MPa. The hydrostatic pressure at which ten percent by volume of glass bubbles collapses may be in a range from 20 MPa to 250 MPa, 38 MPa to 210 MPa, or 50 MPa to 210 MPa. For the purposes of the present disclosure, the collapse strength of the glass bubbles is measured on a dispersion of the glass bubbles in glycerol using ASTM D3102-72 "Hydrostatic Collapse Strength of Hollow Glass Microspheres"; with the exception that the sample size (in grams) is equal to 10 times the density of the glass bubbles. Collapse strength can typically be measured with an accuracy of ± about five percent. Accordingly, each of the collapse strength values provided above can be ± five percent.

Glass bubbles useful for practicing the present disclosure can be obtained commercially and include those marketed by 3M Company, St. Paul, Minn., under the trade designation "3M GLASS BUBBLES" (e.g., grades S60, S60HS, iM30K, iM16K, S38HS, S38XHS, K42HS, K46, and H50/10000). In some embodiments, glass bubbles useful for practicing the present disclosure may be selected to have crush strengths of at least about 28 MPa, 34 MPa, 41 MPa, 48 MPa, or 55 MPa for 90% survival.

The glass bubbles are present in the masterbatch composition disclosed herein at a level of at least 30 percent by weight, based on the total weight of the masterbatch composition. In some embodiments, the glass bubbles are present in the masterbatch composition at at least 32, 33, or 35 percent by weight based on the total weight of the masterbatch composition. In some embodiments, the glass bubbles are present in the masterbatch composition at a level of up to 60, 55, or 50 percent by weight, based on the total weight of the masterbatch composition. For example, the glass bubbles may be present in the masterbatch composition in a range from 30 to 60, 33 to 55, or 35 to 50 percent by weight, based on the total weight of the masterbatch composition.

In some embodiments of the masterbatch composition according to the present disclosure, the glass bubbles may be treated with a coupling agent to enhance the interaction between the glass bubbles and the rubber in the final rubber composition. In other embodiments, a coupling agent can be added directly to the masterbatch composition. Examples of useful coupling agents include zirconates, silanes, or titanates. Typical titanate and zirconate coupling agents are known to those skilled in the art and a detailed overview of the uses and selection criteria for these materials can be found in Monte, S. J., Kenrich Petrochemicals, Inc., "Ken-React® Reference Manual—Titanate, Zirconate and Aluminate Coupling Agents", Third Revised Edition, March, 1995. If used, coupling agents are commonly included in an amount of about 1% to 3% by weight, based on the total weight of the glass bubbles in the composition.

Suitable silanes are coupled to glass surfaces through condensation reactions to form siloxane linkages with the siliceous glass. This treatment renders the glass bubbles more wet-able or promotes the adhesion of materials to the glass bubble surface. This provides a mechanism to bring about covalent, ionic or dipole bonding between glass bubbles and organic matrices. Silane coupling agents are chosen based on the particular functionality desired. Another approach to achieving intimate glass bubble-polymer interactions is to functionalize the surface of microsphere with a suitable coupling agent that contains a polymerizable moiety, thus incorporating the material directly into the polymer backbone. Examples of polymerizable moieties are materials that contain olefinic functionality such as styrenic, vinyl (e.g., vinyltriethoxysilane, vinyltri(2-methoxyethoxy) silane), acrylic and methacrylic moieties (e.g., 3-methacrylroxypropyltrimethoxysilane). Examples of useful silanes that may participate in vulcanization crosslinking include 3-mercaptopropyltrimethoxysilane, bis(triethoxysilipropyl)tetrasulfane (e.g., available under the trade designation "SI-69" from Evonik Industries, Wesseling, Germany), and thiocyanatopropyltriethoxysilane. Still other useful silane coupling agents may have amino functional groups (e.g., N-2-(aminoethyl)-3-aminopropyltrimethoxysilane and (3-aminopropyl)trimethoxysilane). Coupling agents useful for peroxide-cured rubber compositions typically include vinyl silanes. Coupling agents useful for sulfur-cured rubber compositions typically include mercapto or polysulfido silanes. Suitable silane coupling strategies are outlined in Silane Coupling Agents: Connecting Across Boundaries, by Barry Arkles, pg 165-189, Gelest Catalog 3000-A Silanes and Silicones: Gelest Inc. Morrisville, Pa.

In some embodiments, the masterbatch composition includes a processing oil such as those commonly used for rubber processing (e.g., mixing or milling). Useful processing oils include paraffinic processing oils, aromatic processing oils, and naphthene processing oils such as those available, for example, from Process Oils Inc., Houston, Tex., and Michang Oil Ind. Co., Busan, Korea. In some embodiments, the processing oil is paraffinic. The processing oil may be selected based on viscosity or color stability, for example. The masterbatch composition may contain any useful amount of processing oil. In some embodiments, the masterbatch composition includes at least 2 percent by weight or at least 5 percent by weight processing oil (e.g., paraffinic processing oil), based on the total weight of the masterbatch composition. In some embodiments, the masterbatch composition includes up to 15 percent by weight or up to 20 percent by weight processing oil (e.g., paraffinic processing oil), based on the total weight of the masterbatch composition. For example, the masterbatch composition may include processing oil in a range from 1 to 25, 2 to 20, or 2 to 15 percent by weight, based on the total weight of the masterbatch composition.

In some embodiments, the masterbatch composition includes one or more stabilizers (e.g., antioxidants or hindered amine light stabilizers (HALS)). Examples of useful antioxidants include hindered phenol-based compounds and phosphoric acid ester-based compounds (e.g., those available from BASF, Florham Park, N.J., under the trade designations "IRGANOX" and "IRGAFOS" such as "IRGANOX 1076" and "IRGAFOS 168", those available from Songwon Ind. Co, Ulsan, Korea, under the trade designations "SONGNOX", and butylated hydroxytoluene (BHT)). Antioxidants, when used, can be present in an amount from about 0.001 to 1 percent by weight based on the total weight of the masterbatch composition. HALS are typically compounds that can scavenge free-radicals, which can result from photodegradation or other degradation processes. Suitable HALS include decanedioic acid and bis(2,2,6,6-tetramethyl-1-(octyloxy)-4-piperidinyl)ester. Suitable HALS include those available, for example, from BASF under the trade designations "TINUVIN" and "CHIMASSORB". Such compounds, when used, can be present in an amount from about 0.001 to 1 percent by weight based on the total weight of the masterbatch composition.

In some embodiments, the masterbatch composition includes a vulcanization accelerator. A vulcanization accelerator is believed to break sulfur chains and lower the activation energy required for vulcanization. Examples of useful vulcanization accelerators include sulfeneamide vulcanization accelerators (e.g., those made from mercaptobenzothiazole and a primary amine such as cyclohexylamine or tert-butylamine), thiourea vulcanization accelerators (e.g., ethylene thiourea), thiazole vulcanization accelerators (e.g., mercaptobenzothiazole or 2-benzothiazolyl disulfide), dithiocarbamate vulcanization accelerators (e.g., zinc diethyldithiocarbamate and zinc dibutyldithiocarbamate), xanthogenic acid vulcanization accelerators, and thiuram vulcanization accelerators (e.g., tetramethylthiuram disulfide and tetraethylthiuram disulfide). A combination of different classes of vulcanization accelerators may be useful. Such compounds, when used, can be present in an amount from about 0.01 to 2 percent by weight based on the total weight of the masterbatch composition.

In some embodiments, the masterbatch composition includes a vulcanization assistant. Although there are no specific limitations on the type of the vulcanization assistant, poly(ethylene glycol), stearic acid, zinc oxide, or another metal oxide can be useful. Without wanting to be bound by theory, it is believed that in the process of vulcanization, the combination of stearic acid and zinc oxide or another metal oxide provides a rubber-soluble salt that activates the vulcanization accelerators described above. Also, poly(ethylene glycol), which may have any useful molecular weight (e.g., in a range from 200 grams per mole to 8000 grams per mole), is typically compatible with rubbers and may prevent adsorption of the vulcanization accelerators by other components of the rubber composition (e.g., glass bubbles). Vulcanization assistants, when used, can be present in an amount from about 0.01 to 2 percent by weight based on the total weight of the masterbatch composition. The masterbatch may contain a combination of poly(ethylene glycol), stearic acid and zinc oxide, for example, or only one of these compounds.

Reinforcing filler may be useful in the masterbatch composition disclosed herein or in the rubber composition prepared from the masterbatch composition. Reinforcing filler can be useful, for example, for enhancing the durability and strength of the final rubber composition. Also, in rubber processing, filler can be useful for decreasing the stickiness of the rubber processing to facilitate mixing. Examples of useful reinforcing fillers include silica (including nanosilica), other metal oxides, metal hydroxides, and carbon black. Other useful fillers include glass fiber, wollastonite, talc, calcium carbonate, titanium dioxide (including nano-titanium dioxide), wood flour, other natural fillers and fibers (e.g., walnut shells, hemp, and corn silks), and clay (including nano-clay).

However, in some embodiments, the presence of silica in the masterbatch or in the final rubber composition prepared from the masterbatch can lead to undesirable glass bubble breakage. Advantageously, the masterbatch compositions according to the present disclosure allow the pre-mixing of high concentrations of rubber and glass bubbles together in the absence of high filler loadings which can reduce glass bubble breakage either in the masterbatch, in the final let-down rubber composition, or both. Also advantageously, as shown in the Examples, below, it has been found that rubber compositions prepared from the masterbatch compositions disclosed herein have high tensile strength and abrasion resistance even in the absence of silica filler or other reinforcing filler. Accordingly, in some embodiments, the masterbatch is free of silica filler or contains up to 5, 4, 3, 2, or 1 percent by weight silica filler, based on the total weight of the masterbatch.

For the masterbatch composition according to the present disclosure to be stable and combinable with a variety of rubbers to provide a final, let-down rubber composition, it is useful for the masterbatch to be free of a vulcanizing agent. In some embodiments, a vulcanizing agent may be present in the masterbatch composition but in an amount insufficient to cause crosslinking of the of syndiotactic 1,2-polybutadiene and cis 1,4-polybutadiene in the masterbatch composition. Examples of vulcanizing agents are described in further detail, below.

Masterbatch compositions may be processed in mixers commonly used for making rubber compositions (e.g., roll mills including two-roll mills or a Banbury mixer). Elevated temperatures (e.g., in a range from 50° C. to 125° C.) may be useful. The masterbatch may then be formed into a sheet, or it can be added to a granulator to make pellets or granules.

The present disclosure provides a method of combining the masterbatch composition as described in any of the above embodiments with other rubber polymers to provide a rubber composition. The process of combining a masterbatch with other compatible materials is commonly referred to as "letting down" the masterbatch. In the present disclosure, the rubber composition that is made from the masterbatch can also be referred to as the let-down composition. In the present method of "letting down" the masterbatch composition, the other rubber polymers with which the masterbatch is combined typically include at least one of polyisoprene or a polybutadiene rubber. The polybutadiene rubber can be syndiotactic 1,2-polybutadiene as described above, cis-1,4-polybudiene as described above, or a combination thereof. The polybutadiene rubber may also include other stereoisomers of 1,2-polybutadiene (e.g., isotactic or atactic isomers) or trans-1,4-polybutadiene. The polyisoprene rubber can be natural rubber or a synthetic polyisoprene in any isomeric form. In some embodiments, the rubber polymers useful for letting down the masterbatch composition are selected from the group consisting of polybutadiene and polyisoprene. In some embodiments, the rubber polymers useful for letting down the masterbatch composition are selected from the group consisting of polybutadiene and natural rubber. Natural rubber is available from a variety of commercial sources (e.g., from PhuocHoa Rubber Co., Binh Duong Province, Vietnam, under the trade designation "SVR-3L").

Other examples of rubber materials that may be useful for letting down the masterbatch composition, depending on the application, include polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers, fluorinated elastomers, fluorochlorinated elastomers, fluorobrominated elastomers, and combinations thereof. The rubber for letting down the masterbatch composition may be a thermoplastic elastomer. Examples of useful thermoplastic elastomers include block copolymers made up of blocks of glassy or crystalline blocks of, for example, polystyrene, poly(vinyltoluene), poly(t-butylstyrene), and polyester, and elastomeric blocks of, for example, polybutadiene, polyisoprene, ethylene-propylene copolymers, ethylene-butylene copolymers, polyether ester, polyurethane, and combinations thereof. Some thermoplastic elastomers are commercially available, for example, poly(styrene-butadiene-styrene) block copolymers marketed by Kraton Polymers, Houston, Tex., under the trade designation "KRATON".

The material for combining with or "letting down" the masterbatch composition may also include any of the processing oils, stabilizers (e.g., antioxidants or HALS), vulcanization accelerators, vulcanization assistants, and reinforcing fillers described above in any combination. However, in some embodiments, as mentioned above the final, "let-down" rubber composition may be free of silica or substantially free of silica. The term "substantially free" of silica means that the rubber composition may have up to 5%, 4%, 3%, 2%, or 1% by weight silica, based on the total weight of the rubber composition.

In some embodiments, the rubber composition disclosed herein, which can be conveniently prepared from the masterbatch disclosed herein has a ratio of syndiotactic 1,2-polybutadiene to cis-1,4-polybutadiene in a range from 50:50 to 10:90. In some embodiments, the ratio of syndiotactic 1,2-polybutadiene to cis-1,4-polybutadiene is in a range from 40:60 to 10:90 or from 40:60 to 15:85. In some embodiments, the rubber composition disclosed herein has glass bubbles in a range from 5 percent to 20 percent by weight, or 5 percent to 15 percent by weight, based on the total weight of the rubber composition.

Typically, material for combining with a masterbatch to provide a rubber composition and the rubber composition disclosed herein, which may be made from the masterbatch composition, includes a vulcanizing agent. A variety of different vulcanizing agents may be useful. Examples of useful vulcanizing agents include types of sulfur such as powdered sulfur, precipitated sulfur, colloidal sulfur, insoluble sulfur, and highly dispersible sulfur and halogenated sulfurs such as sulfur monochloride and sulfur dichloride. The amount of these sulfurs that may be added may be selected based on the desired concentration in the final, end-use rubber composition. Typically the final, end-use rubber composition will have a range from 0.05 percent by weight to 3 percent by weight sulfur, based on the total weight of the rubber composition. In some embodiments, the vulcanizing agent is an organic peroxide (e.g., cyclohexanone peroxide, t-butylperoxyisopropylcarbonate, t-butylperoxylaurate, t-butylperoxyacetate, di-t-butylperoxyphthalate, di-t-butylperoxymaleate, dicumyl peroxide, 1,3-bis(t-butylperoxyisopropyl)benzene, methylethylketoneperoxide, di-(2,4-di chlorobenzoyl) peroxide, 1,1-di(t-butylperoxy)-3,3,5-trimethylcychlohexane, 2,5-dimethyl-2,5-di(benzoylperoxy)hexane, 2,5-dimethyl-2,5-di(t-butylperoxy)hexane, di-t-butylperoxide, 2,5-dimethyl-2,5-(t-butylperoxy)-3-hexyne, n-butyl-4,4-bis(t-butylperoxy)valerate, a,a'-bis(t-butylperoxy)diisopropylbenzene, and combinations thereof). In these embodiments, the amount of organic peroxide may be in a range from 0.05 percent by weight to 5 percent by weight, based on the total weight of the rubber composition.

Other additives may be incorporated into the masterbatch composition or the rubber composition disclosed herein in any of the embodiments described above. Examples of other additives that may be useful, depending on the intended use of the rubber composition, include preservatives, mixing agents, colorants, dispersants, floating or anti-setting agents, flow or processing agents, wetting agents, UV stabilizers, anti-ozonant, and odor scavengers.

Rubber compositions may be processed in mixers as described above for masterbatch compositions (e.g., roll mills including two-roll mills or a Banbury mixer). Mixing at elevated temperatures (e.g., in a range from 50° C. to 125° C.) may be useful.

Rubber compositions according to and/or made according to the present disclosure may be crosslinked at an elevated temperature (e.g., 150° C. to 160° C.) and optionally elevated pressure (e.g., 100 to 150 kg/cm$^2$). In some embodiments, the rubber composition may be molded into a form of an outer shoe sole before heating the rubber composition. Heating may be carried out for any period of time necessary to crosslink the rubber composition, which may be up to 30, 20, or 10 minutes.

The masterbatch composition, method, and/or rubber composition disclosed herein are useful for making low density products (e.g., having a density in a range from 0.85 to 0.9 grams per cubic centimeter) with good tensile strength, elongation, and abrasion resistance, which are useful properties for a variety of applications. As shown in the Examples, below, abrasion resistances as measured by the NBS durability test that may be achieved by rubber compositions according to and/or made according to the present disclosure can be higher than 150 percent. Elongations at break in a range from 650 to 800 percent or greater and tensile strengths in a range from 85 to 120 kgf/square centimeter may be achieved, which are higher than elongations and tensile strengths of very similar comparative compositions. In addition to outer shoe soles, rubber compositions according to and/or made according to the present disclosure can be useful for making other articles (e.g., o-rings, gaskets, tires or portions of tires, and hoses).

Some Embodiments of the Disclosure

In a first embodiment, the present disclosure provides a masterbatch composition comprising glass bubbles dispersed in a blend of syndiotactic 1,2-polybutadiene and cis-1,4-polybutadiene, wherein the glass bubbles are present in an amount of at least 30 percent by weight, based on the total weight of the masterbatch composition.

In a second embodiment, the present disclosure provides the masterbatch composition of the first embodiment, wherein the glass bubbles are present in an amount of at least 35 percent by weight, based on the total weight of the masterbatch composition.

In a third embodiment, the present disclosure provides the masterbatch composition of the first or second embodiment, wherein the masterbatch does not contain a vulcanizing agent or contains a vulcanizing agent in an amount insufficient to crosslink the blend of syndiotactic 1,2-polybutadiene and cis-1,4-polybutadiene.

In a fourth embodiment, the present disclosure provides the masterbatch composition of any one of the first to third embodiments, wherein the masterbatch composition is free of silica filler or contains up to 5 percent by weight silica filler, based on the total weight of the masterbatch composition.

In a fifth embodiment, the present disclosure provides the masterbatch composition of any one of the first to fourth embodiments, wherein the ratio of syndiotactic 1,2-polybutadiene to cis-1,4-polybutadiene in the blend is in a range from 30:70 to 80:20.

In a sixth embodiment, the present disclosure provides the masterbatch composition of any one of the first to fifth embodiments, wherein the masterbatch composition is substantially free of natural rubber.

In a seventh embodiment, the present disclosure provides the masterbatch composition of any one of the first to sixth embodiments, wherein the masterbatch composition is substantially free of rubbers other than the syndiotactic 1,2-polybutadiene and cis-1,4-polybutadiene.

In an eighth embodiment, the present disclosure provides the masterbatch composition of any one of the first to seventh embodiments, wherein the glass bubbles have a glass composition comprising $SiO_2$ in a range from 70 to 80 percent by weight, alkaline earth metal oxide in a range from 8 to 15 percent by weight, and alkali metal oxide in a range from 3 to 8 percent by weight, each percent by weight based on the total weight of the glass bubbles. In this embodiment, the glass composition may comprises $B_2O_3$ in a range from 2 to 6 percent by weight, based on the total weight of the glass bubbles.

In a ninth embodiment, the present disclosure provides the masterbatch composition of any one of the first to eighth embodiments, further comprising a processing oil.

In a tenth embodiment, the present disclosure provides the masterbatch composition of the ninth embodiment, wherein the processing oil is a paraffinic processing oil.

In an eleventh embodiment, the present disclosure provides the masterbatch composition of any one of the first to tenth embodiments, further comprising at least one of poly (ethylene glycol), an antioxidant, a light stabilizer, a vulcanization assistant, or a vulcanization accelerator. For example, in this embodiment, the masterbatch composition can comprises at least one of a hindered phenol antioxidant or a hindered amine light stabilizer.

In a twelfth embodiment, the present disclosure provides the masterbatch composition of any one of the first to eleventh embodiments, wherein the glass bubbles have an average true density in a range from 0.35 grams per cubic centimeter to 0.6 grams per cubic centimeter.

In a thirteenth embodiment, the present disclosure provides the masterbatch composition of any one of the first to twelfth embodiments, wherein the glass bubbles are treated with a coupling agent.

In a fourteenth embodiment, the present disclosure provides the masterbatch composition of any one of the first to thirteenth embodiments, wherein a hydrostatic pressure at which ten percent by volume of the glass bubbles collapses is at least about 20 megapascals.

In a fifteenth embodiment, the present disclosure provides the masterbatch composition of any one of the first to fourteenth embodiments in sheet form.

In a sixteenth embodiment, the present disclosure provides the masterbatch composition of any one of the first to fourteenth embodiments in pellet form or granule form.

In a seventeenth embodiment, the present disclosure provides a method comprising combining the masterbatch composition of any one of the first to sixteenth embodiments with at least one of a polyisoprene or a polybutadiene to provide a rubber composition.

In an eighteenth embodiment, the present disclosure provides the method of the seventeenth embodiment, wherein the polyisoprene is natural rubber.

In a nineteenth embodiment, the present disclosure provides the method of the seventeenth or eighteenth embodiment, wherein a vulcanizing agent is also combined with the masterbatch composition and the at least one of a polyisoprene or a polybutadiene.

In a twentieth embodiment, the present disclosure provides the method of the nineteenth embodiment, further comprising heating the rubber composition.

In a twenty-first embodiment, the present disclosure provides the method of the twentieth embodiment, which is a method of making a shoe outer sole, further comprising molding the rubber composition into a form of a shoe outer sole before heating the rubber composition.

In a twenty-second embodiment, the present disclosure provides a rubber composition comprising:
  syndiotactic 1,2-polybutadiene;
  cis 1,4-polybutadiene, wherein the ratio of syndiotactic 1,2-polybutadiene to cis-1,4-polybutadiene is in a range from 50:50 to 10:90;
  glass bubbles in a range from 5 to 20 percent by weight, based on the total weight of the rubber composition; and optionally
  polyisoprene;
  wherein the rubber composition is substantially free of silica filler.

In a twenty-third embodiment, the present disclosure provides the rubber composition of the twenty-second embodiment, further comprising a vulcanizing agent.

In a twenty-fourth embodiment, the present disclosure provides the rubber composition of the twenty-second or twenty-third embodiment, further comprising a processing oil.

In a twenty-fifth embodiment, the present disclosure provides the rubber composition of the twenty-fourth embodiment, wherein the processing oil is a paraffinic processing oil.

In a twenty-sixth embodiment, the present disclosure provides the rubber composition of any one of the twenty-second to twenty-fifth embodiments, further comprising at least one of poly(ethylene glycol), an antioxidant, a light stabilizer, a vulcanization assistant, or a vulcanization accelerator. For example, in this embodiment, the rubber composition can include at least one of a hindered phenol antioxidant or a hindered amine light stabilizer.

In a twenty-seventh embodiment, the present disclosure provides the rubber composition of any one of the twenty-second to twenty-sixth embodiments, wherein the glass bubbles have an average true density in a range from 0.35 grams per cubic centimeter to 0.6 grams per cubic centimeter.

In a twenty-eighth embodiment, the present disclosure provides the rubber composition of any one of the twenty-second to twenty-seventh embodiments, wherein the glass bubbles are treated with a coupling agent.

In a twenty-ninth embodiment, the present disclosure provides the rubber composition of any one of the twenty-second to twenty-eighth embodiments, wherein a hydrostatic pressure at which ten percent by volume of the glass bubbles collapses is at least about 20 megapascals.

In a thirtieth embodiment, the present disclosure provides the rubber composition of any one of the twenty-second to twenty-ninth embodiments, wherein the polyisoprene is natural rubber.

In a thirty-first embodiment, the present disclosure provides a vulcanized rubber composition made from the rubber composition of any one of the twenty-third to thirtieth embodiments.

In a thirty-second embodiment, the present disclosure provides a shoe sole made from the rubber composition of any one of the twenty-third to thirtieth embodiments.

The following specific, but non-limiting, examples will serve to illustrate the invention. In these examples, all amounts are expressed in parts per hundred resin (phr) unless specified otherwise. In these examples, N/M means "not measured".

EXAMPLES

Materials was followed. The weight of the specimen was measured before placing it in water, and the weight and volume of the specimen were measured after soaking it in water. The densimeter-calculated values are reported in Tables 2, 4, and 7, below.

Shore A Hardness:

Shore A hardness of Comparative Rubber Compositions A-F and Rubber Compositions 1-6 was measured using a ASKER Type A durometer obtained from Kobunshi Keiki Co., Ltd, Kyoto, Japan, according to the procedure generally outlined in ASTM D2240-05, "Standard Test Method for Rubber Property—Durometer Hardness".

Tensile Strength:

tensile strength of Comparative Rubber Compositions A-F and Rubber Compositions 1-6 was measured using an "INSTRON 5567 EH" instrument obtained from Instron, Norwood, Mass., according to the procedure generally outlined in Test Method A of ASTM D412-06ae2, "Tensile Strength Properties of Rubber and Elastomers".

Elongation at Break:

elongation at break of Comparative Rubber Compositions A-F and Rubber Compositions 1-6 was measured on the "INSTRON 5567 EH" instrument according to the procedure generally outlined in ASTM D412-06ae2.

| TRADE DESIGNATION | DESCRIPTION | SUPPLIER |
| --- | --- | --- |
| "KOSYN KBR-01L" | 1,4 cis polybutadiene (95% content) rubber having a specific gravity of 0.91 g/cm$^3$. | Korea Kumho Petrochemical Co., Seoul, Korea. |
| "BR-1208" | 1,4 cis polybutadiene (98% content) rubber having a specific gravity of 0.91 g/cm$^3$. | LG Chem, Seoul, South Korea |
| "UBEPOL VCR-617" | Syndiotactic 1,2-polybutadiene rubber and cis-1,4-polybutadiene rubber | UBE America Inc., New York, NY |
| "JSR RB-830" | Syndiotactic 1,2-polybutadiene rubber | Japan Synthetic Rubber Co., Tokyo, Japan |
| "SVR-3L" | Natural rubber | Phuoc Hoa Rubber Co., Binh Duong Province, Vietnam |
| none | Butylatedhydroxytoluene (BHT) | Lanxess AG, Leverkusen, Germany |
| "KBM-603" | N-2-(aminoethyl)-3-aminopropyltrimethoxysilane coupling agent | Shin Etsu Chemical Co., Tokyo, Japan |
| "KONION PEG-400" | Polyethylene glycol | KPX Green Chemical Co., Seoul, Korea. |
| "SUNPRAX-682" | Antioxidant | Yongjin Fine Chemical Co., Ulsan, Korea |
| "TINUVIN-770" | Hindered amine light stabilizer | BASF Corporation, Florham Park, NJ. |
| "SONGNOX-1076" | Hindered phenol antioxidant | Songwon Ind. Co, Ulsan, Korea |
| "STRUKTOL SU-135" | Sulfur | Struktol Company of America, Stow, OH. |
| "W-1500" | Processing oil | Michang Oil Ind. Co., Busan, Korea. |
| "PROCESS OIL P-6" | Processing oil | Michang Oil Ind. Co. |
| None | Stearic Acid | LG Chem |
| "ORICEL DM" | 2-benzothiazoyl disulfide | OCI, Seoul, Korea |
| "KUMAC TS" | Tetramethylthiuramonosulfide | Kumho Monsanto, Seoul, Korea |
| None | Zinc Oxide | PJ Chemtech, Yangsan, Kyungnam, Korea |
| "3M Glass Bubbles K42HS" | Hollow glass microspheres having a specific gravity of about 0.42 g/cc | 3M Company, St. Paul, MN |

Test Methods

Specific Gravity:

specific gravity of Comparative Masterbatch Compositions A-B, Masterbatch Compositions 1-5, Comparative Rubber Compositions A-F, and Rubber Compositions 1-6 was measured using a densimeter model MD-200S obtained from A&D Co., Ltd., Tokyo, Japan. The procedure of ASTM D297

Tear Strength:

tear strength of Comparative Rubber Compositions A-F and Rubber Compositions 1-6 was measured using the "INSTRON 5567 EH" instrument according to the procedure generally outlined in ASTM D624-00, "Standard Test Method for Tear Strength of Conventional Vulcanized Rubber and Thermoplastic Elastomers".

NBS Abrasion:

NBS abrasion of Comparative Rubber Compositions A-F and Rubber Compositions 1-6 was measured using an NBS abrasion tester model 6387 obtained from Yasuda Seiki Seisakusho, Ltd., Hyogo, Japan, according to the procedure generally outlined in ASTM D1630-06, "Standard Test Method for Rubber Property—Abrasion Resistance (Footwear Abrader)".

Akron Abrasion:

Akron abrasion of Comparative Rubber Compositions A-F and Rubber Compositions 1-6 was measured using an Akron Abrasion Tester model 690459 obtained from Ueshima Seisakusho, Co., Ltd., Tokyo, Japan, according to the procedure generally outlined in ASTM D5963-04, "Standard Test Method for Rubber Property—Abrasion Resistance (Rotary Drum Abrader)".

Comparative Masterbatch Compositions A and B

Comparative Masterbatch Compositions (Comparative MB) A-B were prepared by combining the ingredients listed in Table 1, below, in a model DS1-5MHB-E kneader obtained from Moriyama Co., Ltd., Japan. The rubber resins, half of the processing oil, half of the glass bubbles, and the other ingredients were mixed in the kneader at 60° C. for five minutes. The second half of the processing oil and the second half of the glass bubbles were added to the kneader, and mixing was continued for five additional minutes. The compounded resin was then dumped from kneader at a temperature of 120° C. The compounded resin was then mixed in a ten-inch open roll model DJ10-25 obtained from Daejung Precision Co., Korea, at 60° C. for three minutes and formed into a sheet having a thickness of seven to eight millimeters (mm) The sheets were then formed into granules using a model FEX-40 granulator obtained from Fine Machine Industry Co., Ltd. In the granulator, the temperature of the cylinder was 75° C., the temperature of the adaptor was 75° C., and the temperature of the die was 80° C. In Table 1, composition is expressed in parts per hundred resin (phr) unless noted otherwise.

TABLE 1

| INGREDIENTS | Comparative MB A | Comparative MB B |
|---|---|---|
| 1,4 cis polybutadiene "BR-1208" | 0 | 95 |
| Natural rubber "SVR-3L" | 0 | 5 |
| 1,4 cis polybutadiene rubber "KOSYN KBR-01L" | 100 | 0 |
| Processing oil "W-1500" | 20 | 0 |
| "PROCESS OIL P-6" | 0 | 45 |
| "3M GLASS BUBBLES K42HS" | 80 | 100 |
| "KONION PEG-400" | 2 | 2 |
| Stearic acid | 1 | 1 |
| Antioxidant "SONGNOX-1076" | 0.3 | 0.3 |
| BHT | 0.5 | 0 |

Specific gravity of Comparative Masterbatch Compositions A-B was measured as described above, and is reported in Table 2, below. Theoretical specific gravity was calculated and is also reported in Table 2.

TABLE 2

| | Specific gravity (g/cm$^3$) | Theoretical Specific gravity (g/cm$^3$) |
|---|---|---|
| Comparative MB A | 0.779 | 0.622 |
| Comparative MB B | 0.661 | 0.618 |

Masterbatch Compositions 1-5

Masterbatch compositions 1-5 (MB 1-5) were prepared as described in Comparative Masterbatch Compositions A-B, except that the ingredients listed in Table 3, below, were used. In Table 3, composition is expressed in parts per hundred resin (phr) unless noted otherwise.

TABLE 3

| INGREDIENTS | MB 1 | MB 2 | MB 3 | MB 4 | MB 5 |
|---|---|---|---|---|---|
| Syndiotactic 1,2-polybutadiene rubber "RB-830" | 70 | 50 | 30 | 30 | 40 |
| 1,4 cis polybutadiene rubber "KOSYN KBR-01L" | 30 | 50 | 70 | 70 | 60 |
| Processing oil "W-1500" | 20 | 20 | 20 | 10 | 20 |
| "3M GLASS BUBBLES K42HS" | 80 | 80 | 80 | 80 | 80 |
| "KONION PEG-4000" | 2 | 2 | 2 | 2 | 2 |
| Stearic acid | 1 | 1 | 1 | 1 | 1 |
| Antioxidant "SONGNOX-1076" | 0.3 | 0.3 | 0.3 | 0.3 | 0.3 |
| BHT | 0 | 0 | 0 | 0 | 0.5 |
| TOTAL (g) | 203.3 | 203.3 | 203.3 | 193.3 | 203.8 |

Specific gravity of Masterbatch Compositions 1-5 was measured as described above, and is reported in Table 4, below. Theoretical specific gravity was calculated and is also reported in Table 4, below.

TABLE 4

| | Specific gravity (g/cm$^3$) | Theoretical Specific gravity (g/cm$^3$) |
|---|---|---|
| Masterbatch 1 | 0.647 | 0.622 |
| Masterbatch 2 | 0.640 | 0.622 |
| Masterbatch 3 | 0.634 | 0.622 |
| Masterbatch 4 | 0.635 | 0.613 |
| Masterbatch 5 | 0.637 | 0.622 |

Comparative Rubber Composition A

Comparative Rubber Composition (Comp. RC) A was prepared adding Comparative Masterbatch Composition A to the ingredients listed in Table 5, below. Comparative Masterbatch Composition A was combined with all the ingredients listed below except for the sulfur, the tetramethylthiuramonosulfide, and the 2-benzothiazoyl disulfide in the model DS1-5MHB-E kneader (Moriyama Co.) and mixed for eight minutes at 60° C. The compounded resin was then dumped from kneader at a temperature of 120° C. The compounded resin was then mixed in the ten-inch open roll model DJ10-25 (Daejung Precision Co.) at 60° C. for three minutes and formed into a sheet having a thickness of five to six mm. The sheets were cooled and aged for four hours at room temperature. A portion of a sheet was then combined with the sulfur, tetramethylthiuramonosulfide, and 2-benzothiazoyl disulfide in the open roll. The resulting composition was mixed at 60° C. for four minutes and then formed again into a sheet. Press molding of samples was carried out after aging at room temperature for at least eight hours. In Table 5, composition is expressed in parts per hundred resin (phr) unless noted otherwise.

TABLE 5

| INGREDIENTS | Comp. RC A | Comp. RC B | Comp. RC C | Comp. RC D | Comp. RC E | Comp. RC F |
|---|---|---|---|---|---|---|
| Masterbatch composition | Comp. MB A | Comp. MB B | Comp. MB B | Comp. MB B | Comp. MB B | None |
| Masterbatch | 15.25 | 14.9 | 14.9 | 14.9 | 14.9 | 0 |
| Natural rubber "SVR-3L" | 15 | 14.7 | 14.4 | 14.1 | 13.8 | 15 |
| 1,4 cis polybutadiene rubber "KOSYN KBR-01L" | 0 | 0 | 0 | 0 | 0 | 4.5 |
| Syndiotactic 1,2-polybutadiene rubber "RB-830" | 12 | 15 | 15 | 15 | 15 | 15 |
| Syndiotactic 1,2-polybutadiene rubber and cis-1,4-polybutadiene rubber "UBEPOL VCR-617" | 65.5 | 64.3 | 64.6 | 64.9 | 65.2 | 65.5 |
| "3M GLASS BUBBLES K42HS" | 0 | 0 | 0 | 0 | 0 | 6 |
| Stearic Acid | 1 | 0 | 0 | 0 | 0 | 1 |
| Zinc Oxide | 2 | 2 | 2 | 2 | 2 | 2 |
| Processing oil "W-1500" | 0 | 0 | 0 | 0 | 0 | 1.5 |
| Antioxidant "SUNPRAX-682" | 1 | 0 | 0 | 0 | 0 | 1 |
| Stabilizer "TINUVIN-770" | 0.5 | 0 | 0 | 0 | 0 | 0.5 |
| Antioxidant "SONGNOX-1076" | 0.5 | 0 | 0 | 0 | 0 | 0.5 |
| Sulfur "STRUKTOL SU-135" | 0.7 | 0.7 | 0.7 | 0.7 | 0.7 | 0.7 |
| 2-benzothiazoyl disulfide | 0.7 | 0 | 0 | 0 | 0 | 0.7 |
| Tetramethylthiuramonosulfide | 0.10 | 0 | 0 | 0 | 0 | 0.10 |

Comparative Rubber Compositions B-E

Comparative Rubber Compositions (Comp. RC) B-E were prepared as described in Comparative Rubber Composition A, except that Comparative Masterbatch Composition B was used. Ingredients are shown in Table 5, above.

Comparative Rubber Composition F

Comparative Rubber Composition F (Comp. RC F) was prepared as generally described in Comparative Rubber Composition A, except that no masterbatch composition was used and glass bubbles were added directly to the kneader instead. Ingredients are shown in Table 5, above.

Rubber Compositions 1-6

Rubber Compositions 1-6 (RC 1-6) were prepared as described in Comparative Rubber Composition A, except that Masterbatch Compositions 1-5 were added to the ingredients listed in Table 6, below.

TABLE 6

| INGREDIENTS | RC 1 | RC 2 | RC 3 | RC 4 | RC 5 | RC 6 |
|---|---|---|---|---|---|---|
| Masterbatch type | MB 1 | MB 1 | MB 2 | MB 3 | MB 4 | MB 5 |
| Masterbatch (phr) | 15.25 | 15.25 | 15.25 | 15.25 | 14.50 | 15.25 |
| Natural rubber "SVR-3L" (phr) | 15 | 15 | 15 | 15 | 15 | 15 |
| 1,4 cis polybutadiene rubber "KOSYN KBR-01L" (phr) | 67.75 | 0 | 0 | 0 | 0 | 0 |
| Syndiotactic 1,2-polybutadiene rubber "RB-830" (phr) | 9.75 | 9.75 | 11.25 | 12.75 | 12.75 | 12 |
| Syndiotactic 1,2-polybutadiene rubber and cis-1,4-polybutadiene rubber "UBEPOL VCR-617" (phr) | 0 | 67.75 | 66.25 | 64.75 | 64.75 | 65.5 |
| Stearic Acid (phr) | 1 | 1 | 1 | 1 | 1 | 1 |
| Zinc Oxide (phr) | 2.5 | 2 | 2 | 2 | 2 | 2 |
| Antioxidant "SUNPRAX-682" (phr) | 1 | 1 | 1 | 1 | 1 | 1 |
| Stabilizer "TINUVIN-770" (phr) | 0.5 | 0.5 | 0.5 | 0.5 | 0.5 | 0.5 |
| Antioxidant "SONGNOX-1076" (phr) | 0.5 | 0.5 | 0.5 | 0.5 | 0.5 | 0.5 |
| Sulfur (phr) | 0.93 | 0.7 | 0.7 | 0.7 | 0.7 | 0.7 |
| 2-benzothiazoyl disulfide (phr) | 0.93 | 0.93 | 0.93 | 0.93 | 0.93 | 0.7 |
| Tetramethylthiuramonosulfide (phr) | 0.13 | 0.13 | 0.13 | 0.13 | 0.13 | 0.10 |

Comparative Rubber Compositions A-F, and Rubber Compositions 1-6 were tested according to the test methods described above. Results are shown in Table 7, below.

TABLE 7

| Rubber Composition | Specific Gravity (g/cm$^3$) | Shore A hardness | Tensile strength (kgf/cm$^2$) | Elongation at break (%) | Tear Strength (kg/cm) | NBS Abrasion (%) | Akron Abrasion (cc loss) |
|---|---|---|---|---|---|---|---|
| Comp. RC A | 0.89 | 64 | 84.3 | 740 | 37 | 155 | 0.25 |
| Comp. RC B | 0.878 | 64 | 76.8 | 570 | 36.7 | 138 | N/M |
| Comp. RC C | 0.878 | 64 | 69.0 | 548 | 38.9 | 145 | N/M |
| Comp. RC D | 0.884 | 64 | 85.0 | 607 | 42.2 | 153 | N/M |
| Comp. RC E | 0.88 | 64 | 81.7 | 629 | 41.7 | 135 | N/M |
| Comp. RC F | 0.89 | 65 | 88.1 | 760 | 34.5 | 165 | 0.25 |

TABLE 7-continued

| Rubber Composition | Specific Gravity (g/cm³) | Shore A hardness | Tensile strength (kgf/cm²) | Elongation at break (%) | Tear Strength (kg/cm) | NBS Abrasion (%) | Akron Abrasion (cc loss) |
|---|---|---|---|---|---|---|---|
| RC 1 | 0.887 | 67.5 | 110.9 | 680 | 40.7 | N/M | 0.228 |
| RC 2 | 0.89 | 67 | 104.3 | 680 | N/M | N/M | 0.232 |
| RC 3 | 0.89 | 67 | 118 | 660 | N/M | N/M | 0.242 |
| RC 4 | 0.89 | 67 | 113.5 | 666 | N/M | N/M | 0.209 |
| RC 5 | 0.881 | 65.5 | 89.1 | 666 | 34.6 | N/M | N/M |
| RC 6 | 0.89 | 65 | 91.8 | 770 | 36.6 | 158 | 0.24 |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A masterbatch composition comprising glass bubbles dispersed in a blend of syndiotactic 1,2-polybutadiene and cis-1,4-polybutadiene, wherein the glass bubbles are present in an amount of at least 30 percent by weight, based on the total weight of the masterbatch composition.

2. The masterbatch composition of claim 1, wherein the masterbatch composition does not contain a vulcanizing agent or contains a vulcanizing agent in an amount insufficient to crosslink the blend of syndiotactic 1,2-polybutadiene and cis-1,4-polybutadiene.

3. The masterbatch composition of claim 1, wherein the masterbatch composition is free of silica filler or contains up to 5 percent by weight silica filler, based on the total weight of the masterbatch composition.

4. The masterbatch composition of claim 1, wherein the ratio of syndiotactic 1,2-polybutadiene to cis-1,4-polybutadiene in the blend is in a range from 30:70 to 80:20.

5. The masterbatch composition of claim 1, further comprising a processing oil.

6. The masterbatch composition of claim 1, wherein the glass bubbles have an average true density in a range from 0.35 grams per cubic centimeter to 0.6 grams per cubic centimeter.

7. The masterbatch composition of claim 1, wherein a hydrostatic pressure at which ten percent by volume of the first plurality of glass bubbles collapses is at least about 20 megapascals.

8. The masterbatch composition of claim 1 in sheet form, pellet form, or granule form.

9. The masterbatch composition of claim 1, further comprising at least one of a hindered phenol antioxidant or a hindered amine light stabilizer.

10. A method comprising combining the masterbatch composition of claim 1 with at least one of a polyisoprene or a polybutadiene to provide a rubber composition.

11. The method of claim 10, wherein a vulcanizing agent is also combined with the masterbatch composition and the at least one of a polyisoprene or a polybutadiene.

12. The method of claim 11, which is a method of making a shoe outer sole, further comprising molding the rubber composition into a form of an outer shoe sole before heating the rubber composition.

13. The masterbatch composition of claim 1, wherein the glass bubbles are treated with a coupling agent.

14. The masterbatch composition of claim 1, wherein the masterbatch composition is substantially free of natural rubber.

15. The masterbatch composition of claim 1, wherein the masterbatch composition is substantially free of rubbers other than the syndiotactic 1,2-polybutadiene and cis-1,4-polybutadiene.

16. The masterbatch composition of claim 1, further comprising at least one of poly(ethylene glycol), an antioxidant, a light stabilizer, a vulcanization assistant, or a vulcanization accelerator.

17. The method of claim 11, further comprising heating the rubber composition.

* * * * *